(No Model.)
T. H. BROWN.
TWO WHEELED VEHICLE.
No. 339,615. Patented Apr. 13, 1886.
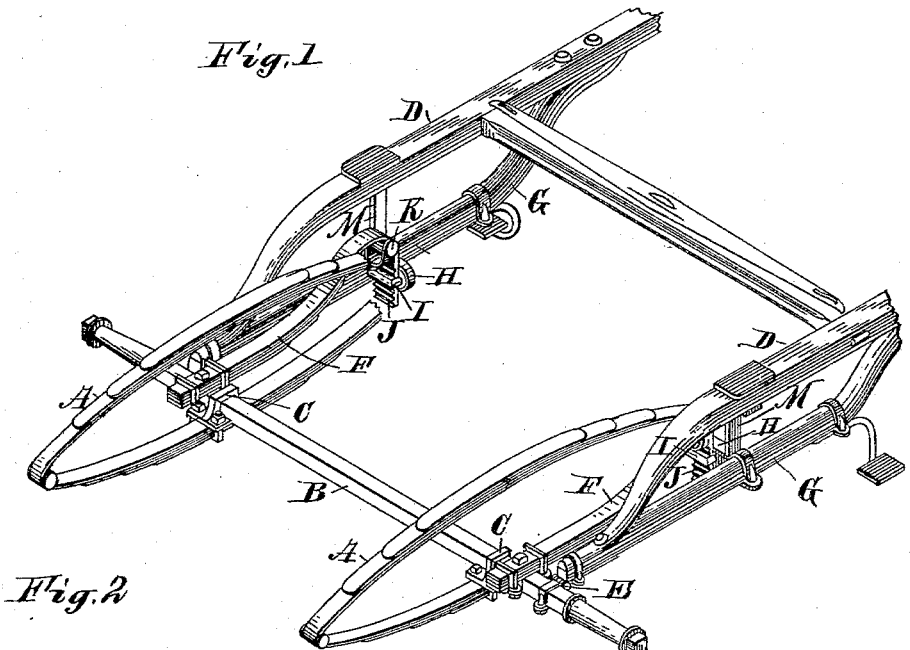
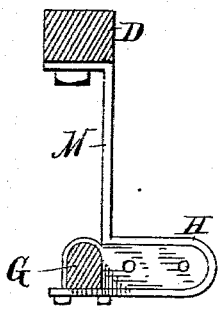
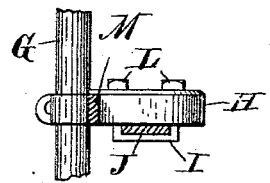

UNITED STATES PATENT OFFICE.

THOMAS H. BROWN, OF MILWAUKEE, WISCONSIN.

TWO-WHEELED VEHICLE.

SPECIFICATION forming part of Letters Patent No. 339,615, dated April 13, 1886.

Application filed May 12, 1885. Serial No. 165,179. (No model.)

*To all whom it may concern:*

Be it known that I, THOMAS H. BROWN, of Milwaukee, in the county of Milwaukee and State of Wisconsin, have invented new and useful Improvements in Two-Wheeled Vehicles; and I do hereby declare the following to be a full, clear, and exact description of said invention, reference being had to the accompanying drawings, and to the letters or figures of reference marked thereon, which form a part of this specification.

My invention relates to improvements in two-wheeled vehicles; and it consists in certain improved devices and in certain combinations and arrangements of devices, as hereinafter set forth.

Figure 1 of the drawings represents a perspective view of that part of the vehicle which embodies my improvements. Figs. 2 and 3 are details.

Like parts are represented by the same reference-letters throughout the several views.

The objects of my improvements, among others, are to overcome the so-called "horse-motion" of the vehicle; or, in other words, to prevent the up and down motion of the horse in traveling from being transmitted to the body of the carriage, and also to provide a more convenient means of adjusting the thills to horses of different heights without inclining or changing the position of the body of the vehicle.

Heretofore attempts have been made to overcome the so-called "horse-motion" by using platform-springs and other special forms of springs. By my improvements I am enabled not only to more effectually overcome such motion than heretofore, but at the same time to use the common form of elliptical springs, or any other form of springs desired.

A A are ordinary elliptical springs, which are rigidly affixed to the axle B by clips C C. The rear ends of the thills D D are coupled to the axle B by ordinary jointed or flexible thill-couplings E E, which permit said thills to move upward and downward with the horse without turning or moving the axle, and consequently without moving the springs or the body supported thereon.

To prevent the axle, with the springs and body thereon, from turning or inclining forward and rearward as the weight in the vehicle is brought in front or rear of the axle, it becomes necessary to connect the axle with the thills, and to accomplish this object without communicating the motion of the thills to the axle I use two short springs, F F, the rear ends of which are rigidly affixed to the axle, while their forward ends are connected with the thills. The thills D are preferably, but not necessarily, made double at their rear ends, as shown in Fig. 1 of the drawings, and as illustrated and claimed in my previous application, No. 88,013, allowed December 11, 1884, as they are thereby much stiffer and capable of supporting a heavier weight. When the present form of thill is used, the front ends of the springs F are connected with the lower bars, G, by the arms H H, keepers I I, and the adjusting-plates J. The upper ends of the plates J are connected to the front ends of the springs F by pivotal bolts K. The plates J are grooved or corrugated upon their rear surface for the reception of the keepers I, whereby I am enabled by loosening the nuts L L (shown in Fig. 3) to raise or lower said plates within the keepers and adjust the same at any desired point corresponding with the spaces between such corrugations, and thus adjust the thills at any desired angle to conform to the height of the horse used without inclining or changing the position of the body of the vehicle.

It will be obvious that the front ends of the springs F will yield to the upward and downward movement of the thills without imparting the ordinary rolling movement to the axle, while they serve the twofold purpose of holding the axle and body in their proper position, and also co-operate with the adjusting-plate and keeper in adjusting the thills at the desired angle.

M M are strengthening bars or braces, by which the upper and lower parts of the thills are connected together and their combined strength united to resist the weight brought to bear upon them.

Having thus described my invention, what I claim as new, and desire to secure by Letters Patent, is—

In two-wheeled vehicles, the combination of the axle B, forward projecting springs F F, thills D, formed at their rear ends in two parts connected centrally by bars M M, arm H, adjusting-plates J, and retaining-keepers I, all substantially as and for the purpose set forth.

In testimony whereof I affix my signature in presence of two witnesses.

THOMAS H. BROWN.

Witnesses:
JAS. B. ERWIN,
C. T. BENEDICT.